May 31, 1966 M. J. DE GOOD ETAL 3,253,697
VARIABLE PRESSURE CONVEYOR
Filed July 13, 1964 3 Sheets-Sheet 1
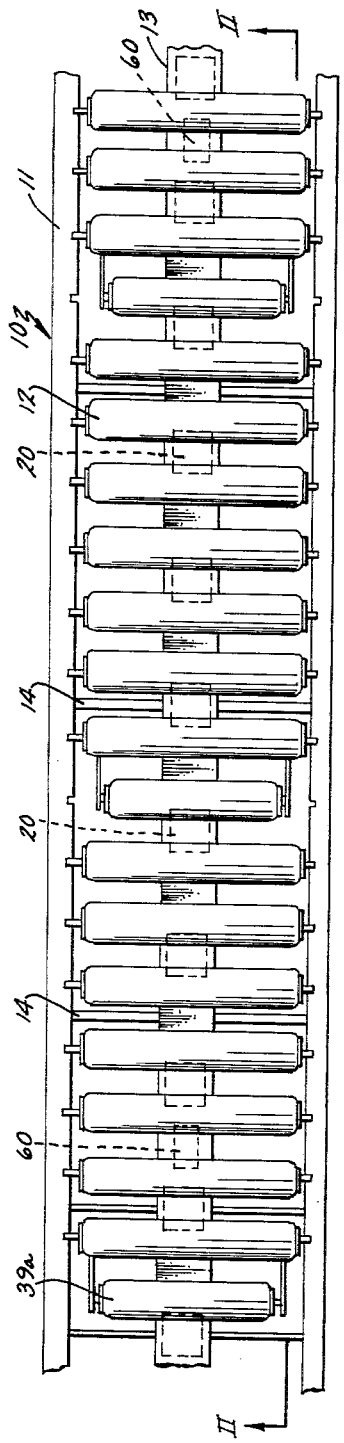
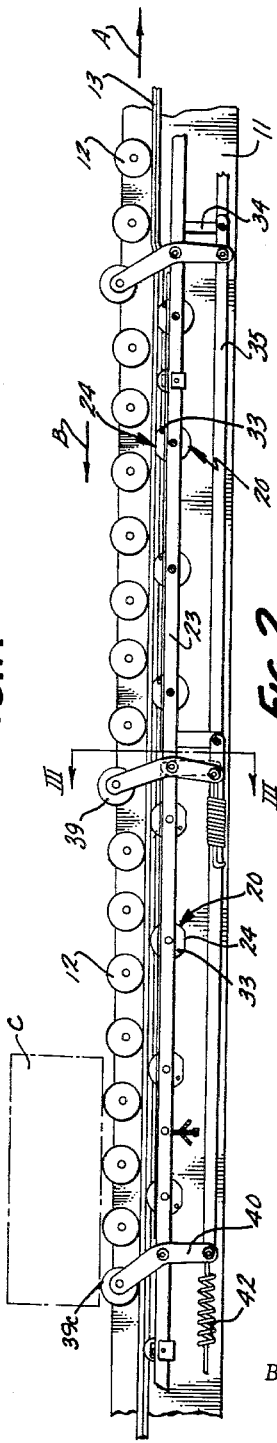
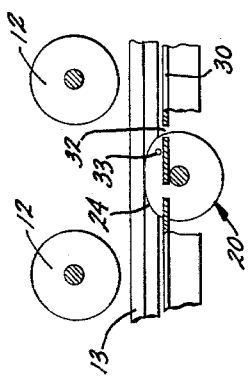
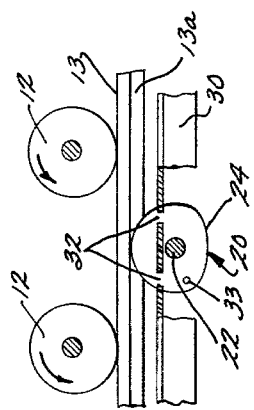
INVENTORS
MAYNARD J. DE GOOD
CLYDE L. BOWMAN
BY
ATTORNEYS

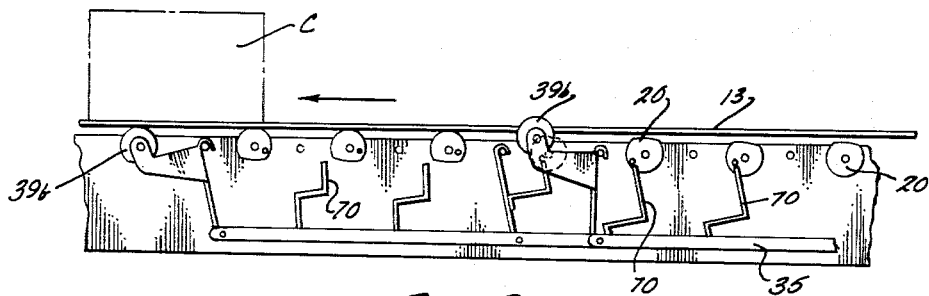
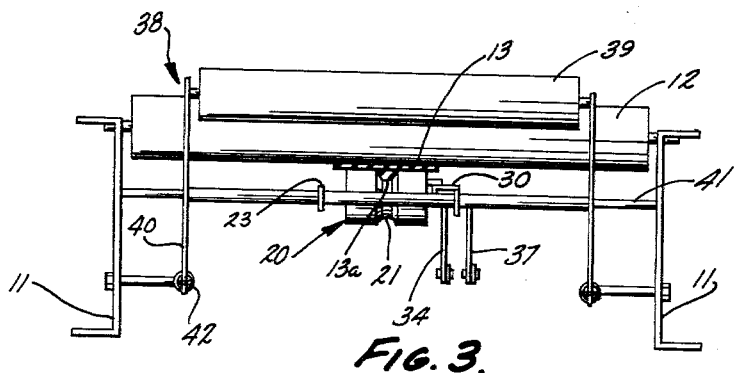
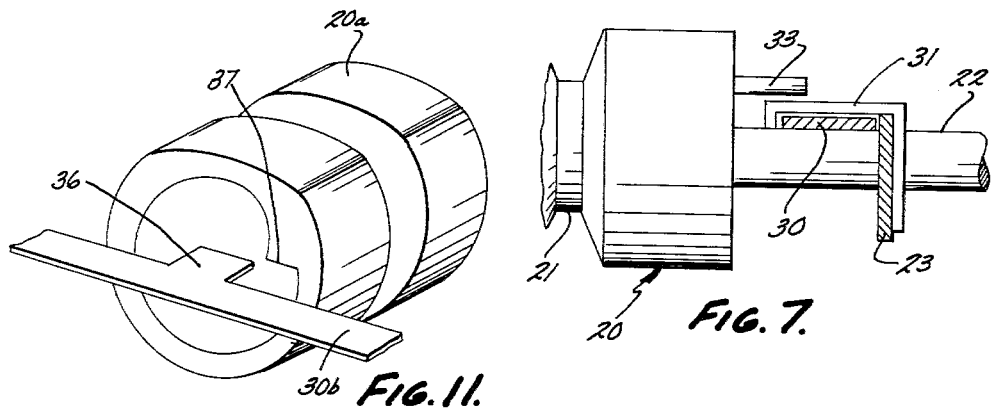
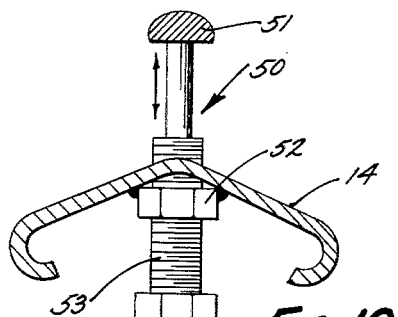

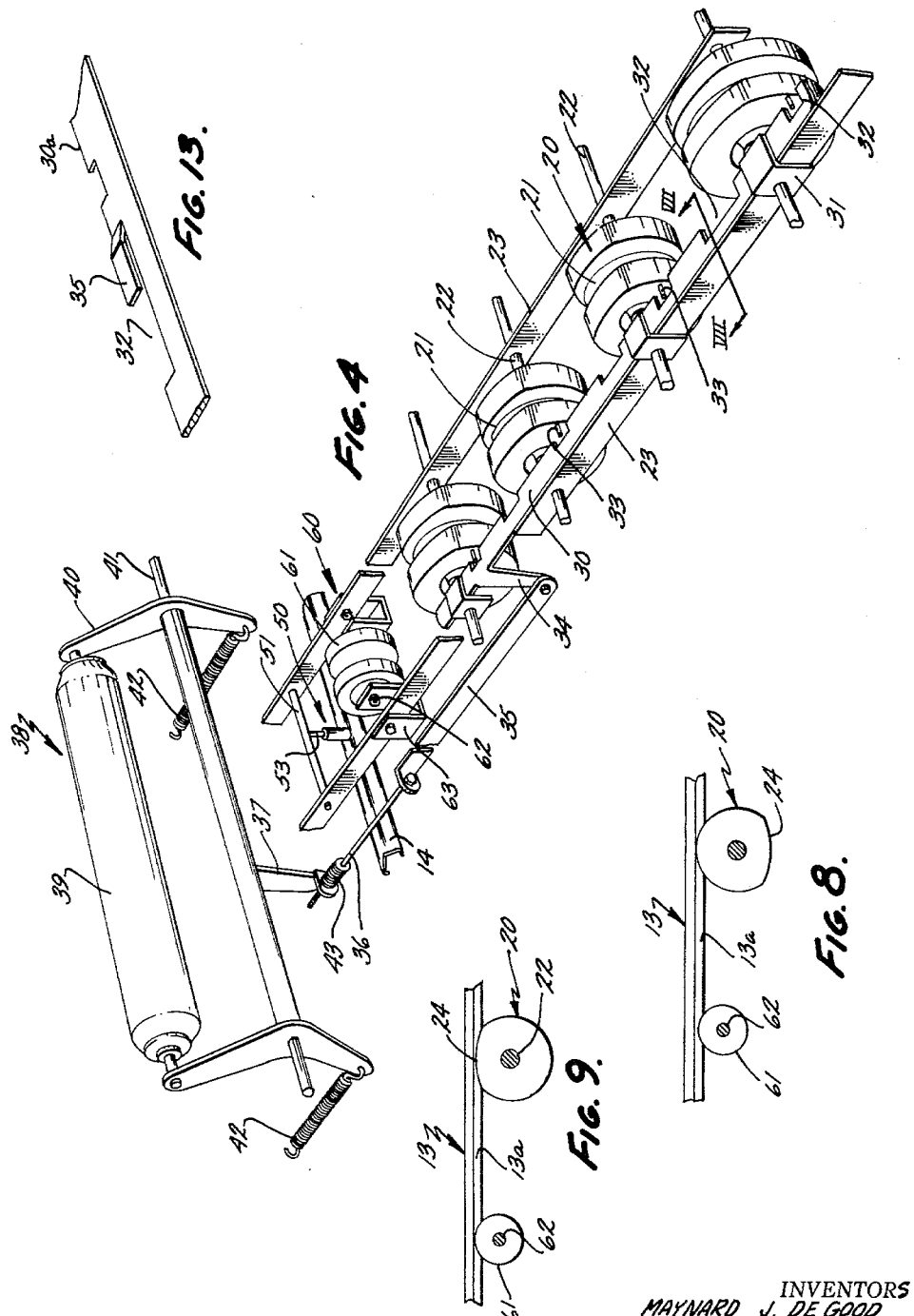

United States Patent Office 3,253,697
Patented May 31, 1966

3,253,697
VARIABLE PRESSURE CONVEYOR
Maynard J. De Good and Clyde L. Bowman, Grand Rapids, Mich., assignors to The Rapids-Standard Company, Inc., Grand Rapids, Mich., a corporation of Michigan
Filed July 13, 1964, Ser. No. 381,968
10 Claims. (Cl. 198—127)

This invention relates to conveyors, and particularly to conveyors of the type which automatically control the movement of articles along the conveyor. It is related to conveyors of the type disclosed in United States Patents 3,012,652 and 3,062,359.

This invention constitutes an improvement in conveyors in which means are provided by which the application of propelling force to articles can be terminated automatically when the lead article's forward motion is stopped for any reason. This invention provides a simplified, less expensive, and more effective way of accomplishing this purpose. It also permits the propelling member supports to be mounted on stationary shafts eliminating the necessity for vertically movable support structures. It also provides a conveyor capable of handling a wider range of weights and sizes. It carries out its function by a new and different structural arrangement.

These and other objects and advantages of this invention will be understood by those acquainted with the conveyorization of articles upon reading the following specification and the accompanying drawings.

In the drawings:

FIG. 1 is a somewhat schematic plan view of a roller conveyor incorporating this invention;

FIG. 2 is a sectional elevation view taken along the plane II—II of FIG. 1;

FIG. 3 is a sectional elevational view taken along the plane III—III of FIG. 2;

FIG. 4 is a fragmentary oblique view of the operating structure of this invention with the belt removed;

FIG. 5 is a fragmentary side elevation view illustrating the invention in one operative position;

FIG. 6 is a view similar to FIG. 5 showing the invention in another operating position;

FIG. 7 is a fragmentary sectional elevation view taken along the plane VII—VII of FIG. 4;

FIG. 8 is a fragmentary sectional elevation view illustrating the operation of the propelling member control wheels in one operating position of the propelling member;

FIG. 9 is a view similar to FIG. 8 but showing the conveyor with the propelling member in a different operating position;

FIG. 10 is an enlarged detailed sectional elevation view of the adjustment mechanism for the conveyor;

FIG. 11 is an enlarged oblique, somewhat schematic view of a modified form of the invention;

FIG. 12 is a sectional elevation view similar to FIG. 2 showing the invention applied to a conveyor in which the propelling member makes direct frictional contact with the articles on the conveyor; and FIG. 13 is a fragmentary, oblique view of a modified locking slide for this invention.

In executing the objects and purposes of this invention, a conveyor is provided having a constantly driven, endless propelling member supported by rollers of eccentric shape. The construction of the rollers is such that during each revolution, the propelling member is raised and lowered. In its fully raised position, the propelling member is active to propel articles along the conveyor. When the propelling member is in its lowered position, it is inactive for the purpose of propelling the articles. Control means are provided for locking these eccentric supporting rollers against rotation when the propelling member is in lowered or inactive position. This control means regulating the rotation of the eccentric supports is connected to an actuator which, in the form of the invention illustrated, is triggered by the articles themselves as they move along the conveyor. However, it should be kept in mind that other means for triggering the action of this control mechanism could be provided within the framework of this invention.

Referring specifically to the drawings, the numeral 10 indicates a roller conveyor having conventional side frame members 11 between which extend a plurality of driven or propelling rollers 12. The rollers are arranged in spaced relationship along the conveyor and in a common plane to form a conveying surface. Beneath the rollers 12 is a driven propelling member 13 moved by any suitable power means in the direction of the arrow A of FIG. 2, thus rotating the rollers 12 to move articles in the direction of the arrow B. At suitable intervals the side frame members 11 are connected by rigid cross braces 14.

The upper run of the propelling member 13 is supported on eccentric or cam rollers 20. These rollers are placed at equal intervals along the length of the conveyor. Where the propelling member is a belt having a depending central tracking ridge 13a (FIG. 3), these rollers are of sufficient width to support a substantial portion of the propelling member laterally and are equipped with a central circumferential channel 21 to receive the tracking rib. Each of the rollers is mounted for free rotation upon a shaft 22 mounted to the side frame members 11 (FIG. 4). The shafts 22 also support the center bands 23 which extend lengthwise of the conveyor.

Each of the cam rollers 20 has a constant radius extending throughout a substantial portion of its circumference (FIGS. 5 and 6). The remaining peripheral portion of the roller is somewhat flattened on a curvature of much greater radius, generated about a point eccentric to the shaft 22. Thus, the radial distance from the center of the point of rotation, that is the shaft 22, to the center of the flattened surface 24 is substantially less than the radial distance to the remainder of the periphery of the roller. Such a roller when the flattened surface 24 is upwardly positioned beneath the propelling member 13, permits the propelling member to drop sufficiently to disengage the propelling rollers 12 (FIG. 6). However, throughout the remainder of the circumference of the cam roller, the radius of the peripheral surface is such as to raise the propelling member into contact with the propelling rollers 13 (FIG. 5). Thus, during each revolution of the cam rollers 20, the propelling member is held in driving position for a substantial portion of the total period of revolution of the cam roller, but drops during a minor portion of this revolution. The portion of the cam roller 20 which is of the greater and constant radius represents approximately 75% of its total circumference. Only 25% is devoted to the cam portion. In addition, where the cam or flattened portion of the surface joins the remainder of the periphery of the roller, there is a transition zone rather than a sharp break. Thus, the propelling force of the propelling member 13 is active during more than 75% of each revolution of the cam roller.

On one side of the cam rollers 20 and between them and the adjacent center band 23, a stop means or locking slide 30 is slidably seated on the shafts 22. Each locking slide 30 is common to several of the cam rollers 20, the number being determined by the size of the articles to be conveyed. Thus, it might include three, four or even fifteen or twenty of the cam rollers 20. In the particular construction illustrated, each slide cooperates with four of the cam rollers 20. The length of the slide will be determined by the length of the zone which is determined to be suitable for change in belt attitude for each article as it passes along the conveyor. The slide 30 is held against lateral displacement by a generally inverted J-shaped clip 31 mounted at each of the axles (FIGS. 4 and 7).

The locking slide 30 has a plurality of spaced notches 32, two for each of the cam rollers 20. These notches cooperate with a laterally extending tooth or pin 33 on each of the cam rollers. When the locking slide is in one position, the pins pass through the adjacent notches permitting the cam roller 20 to rotate freely. When the slide is shifted lengthwise of the conveyor to misalign the notches with the pins, the abutment of the pins against the locking slide prevents rotation of the cam rollers 20. The pin on each cam roller is so positioned that when the pin is stopped by the slide, the cam rollers are always positioned with the flattened surface 24 upwardly beneath the propelling member. It will be noted that the alternative slots are longer, permitting the pin to pass through them at all times, irrespective of whether the slide is advanced or retracted.

The locking slide 30 has a depending leg 34 pivotally connected to a link 35 which, in turn, is connected to a rod 36. The rod 36 is secured to the lever arm 37 of the sensing roller assembly 38. The sensing roller assembly 38 consists of a sensing roller 39 mounted on rocker arms 40 pivotable about the shaft 41. The lower ends of the arms 40 are attached to springs 42 which bias the sensing roller 39 upwardly and the locking slide 30 into advanced or non-engaging position. As will be seen from FIG. 2, the sensing rollers 39, in normal position, are raised slightly above the plane of the conveying surface of the conveyor. Thus, as an article C passes over them, they are depressed as indicated by the roller 39a. This pivots the assembly 38 to shift the stop slide 30 to engage and hold the pins 33. One of the sensing assemblies 38 is provided for each group of cam rollers 20 controlled by a single locking slide 30. To overcome the problem of tolerance accumulation, adjustment is permitted by the adjustment assembly 43 where the rod 36 is secured to the leg 37 (FIG. 4).

At periodic spacings, such as five or ten feet, vertical adjustment means 50 are provided to permit proper adjustment of the vertical position of the propelling member to assure adequate frictional contact with the driving rollers 12 to effect article transportion, but insufficient pressure to lift the rollers and thus transfer the weight of the articles to the cam roller rather than the shafts of the rollers 12. This adjustment mechanism is illustrated in FIGS. 4 and 10. It consists of a cross bar 51 extending between the center bands 23. A threaded member 52 is secured to the cross braces 14 of the conveyor frame. Through this passes an upwardly extending threaded stud stud 53. The upper end of the stud 53 contacts the cross bar 50 and by rotation can be made to raise or lower the center bands 23 and thus the entire assembly of the cam rollers 20. In this operation, the shafts 22 are bent but the amount of bending is immaterial since the vertical adjustment is normally within the range of about 0.125 of an inch.

At periodic intervals such as five feet or so, tracking assemblies 60 are provided for the propelling member. As best shown in FIG. 4, the tracking assemblies consist of a pair of closely spaced wheels 61 mounted for free rotation upon an axle 62 which in turn is secured to the center bands 23 by U-shaped clips 63. The spacing of the wheels 61 is such that they receive the guiding rib 13a of the propelling member between them.

These tracking assemblies serve a dual purpose. As best illustrated in FIGS. 8 and 9, the top surfaces of the guide wheels 61 are intermediate the upper and lower limits of movement of the propelling member 13. Thus, when the propelling member 13 is in its raised position and riding on the area of uniform radius of the cam rollers 20, the propelling member is lifted slightly off the tops of the guide wheels 61. However, the guiding rib 13a remains between them and their guiding function is maintained. However, when the flattened portion 24 of the cam rollers 20 is uppermost, the guide wheels 61 support the propelling member slightly above the top surface of the cam rollers 20. This materially reduces the amount of drag imposed upon the belt when the cam rollers 20 are locked against rotation by the slide 30. At the same time, the guide wheels at all times having engagement with the depending rib on the propelling member, track the propelling member and keep it properly aligned on the conveyor so that the sides of this rib do not rub on the sides of the circumferential channels 21 of the camming rollers 20 and thus, create excessive friction or wear between these elements.

FIG. 12 illustrates the application of this invention to a conveyor in which the belt is mounted substantially at the conveying surface, and as such, makes direct physical contact with the articles, rather than contacting driving rollers which in turn transport the articles. The construction of this conveyor is identical to that of the conveyor illustrated in FIG. 1 except that upwardly extending fingers 70 are provided on the bar 35 to make contact with the pins 33 on the sides of the cam rollers 20. Instead of a sensing roller 39, a pair of conveyor wheels 30a are substituted, one on each side of the propelling member 13.

It will be understood that the sensing unit 38 is spaced downstream of the conveyor from the particular cam rollers 20 it operates. Thus, the actuation of a sensing unit does not affect those of the cam rollers 20 responsible for driving the particular article which is activating the sensing unit, but rather controls the action of the camming rollers effective for the next following article moving along the conveyor. This, of course, is true of both forms of the conveyor, that illustrated in FIG. 1 and that illustrated in FIG. 12.

FIG. 13 illustrates a modification of the locking slide. In this case, the locking slide 30a has elongated notches 32b and a spring finger 35. The spring finger is raised slightly above the plane of the slide 30a and serves two purposes. First, in the event that the pin 33 happens to make direct contact with the slide when it is actuated by the sensing unit, the spring finger 35 will give slightly, permitting the pin to either shift above or below it. This prevents damage to the unit. Further, the use of the spring finger 35 provides a certain amount of shock absorption when the momentum of the wheel is stopped by engagement between the pin and the finger.

FIG. 11 shows a further modification of this invention in which the slide 30b has a single inwardly extending finger 36 designed to engage an offset tooth or shoulder 37 on the inside of the recessed end of the cam roller 20a. The function is identical to that illustrated in FIG. 4, the only difference being that the slide engages a shoulder rather than a pin. It will be recognized that other means of stopping the rotation of the cam rollers and of indexing the position at which they are stopped may be provided within the scope of this invention.

Having described the structure of this invention and its relationship to the prior art Patents 3,012,652 and 3,062,359, it is believed that its operation and function will be obvious. As the articles move along the conveyor under the propelling influence of the driven propelling member, they will pass over each of the sensing units 38 in succession. Each time they pass over a sensing unit, they will shift the connected locking slide to engage the rollers in an area upstream of the conveyor of the sensing roller thus activated. As a result, propelling force in the area above the cam rollers so stopped will cease due to disengagement of the frictional connection between the belt and the article. If the article's forward motion is halted where it is resting upon one of the sensing units, the propelling effect of the belt will be eliminated in a zone immediately upstream of the article, thus halting the forward motion of the next following article when it enters that zone. The length of the zones is such that the next following article will come to rest on the next sensing unit. This creates an additional zone in which the propelling unit is lowered, ready to stop the motion of the next article. In this manner, the conveyor will continue to extend the zone of no propelling force upstream of the conveyor as more and more articles enter the zone. As soon as the obstruction to the forward motion of the lead article is released, since it is under constant propelling force, it will initiate its forward motion releasing the sensing unit on which it has been resting. This will immediately restore propelling force to the next rearward article and, thus, its motion will be initiated. This will continue as a chain reaction back up the conveyor until all of the articles are once more moving along the conveyor.

Having fully described this invention, it will be understood that only a preferred embodiment of the invention has been shown, and that other embodiments may be made incorporating the principles of this invention. Such of these embodiments as incorporate the principles of this invention are to be considered as included within the hereinafter appended claims, unless these claims by their language expressly state otherwise.

We claim:

1. A conveyor having a conveyor track for transporting articles and a driven propelling member for moving the articles along said track; means supporting said propelling member in both raised and lowered positions, the propelling force of said propelling member when said propelling member is in raised position being frictionally transmitted to the articles and no propelling force being transmitted to the articles when the propelling member is in lowered position, said means comprising: a plurality of elements arranged at spaced intervals along the length of said conveyor; each of said elements being eccentric in cross section with the portion of least radius forming a rest area; means rotatably mounting said elements and stop means for holding said elements against rotation with said rest area positioned upwardly beneath said propelling member and supporting said propelling member in its lowered position.

2. A conveyor having a conveyor track for transporting articles and a driven propelling member for moving the articles along said track; means supporting said propelling member in both raised and lowered positions, the propelling force of said propelling member when said propelling member is in raised position being frictionally transmitted to the articles and no propelling force being transmitted to the articles when the propelling member is in lowered position, said means comprising: a plurality of elements arranged at spaced intervals along the length of said conveyor; each of said elements being of circular cross section except for a rest area throughout which the surface of the element is spaced at a lesser distance from the center of the element than that of the surface of the remainder of the element; means rotatably mounting said elements and stop means for holding said elements against rotation with said rest area positioned upwardly beneath said propelling member and supporting said propelling member in its lowered position.

3. A conveyor as described in claim 2 wherein sensing means is provided and is connected to said stop means; said sensing means being positioned to be actuated by articles moving along said track and when actuated biasing said stop means into position holding said elements against rotation.

4. A conveyor as described in claim 2 wherein said stop means is a bar mounted for sliding movement lengthwise of said conveyor between advanced and retracted positions; said bar having a plurality of abutment surfaces thereon one adjacent each of said elements; each of said elements having a tooth positioned to engage one of said abutment surfaces when said bar is in advanced position.

5. A conveyor as described in claim 4 wherein said bar has notches on one side separating said abutment surfaces and said tooth is a pin projecting from the side of said elements, said pin being adapted to pass through said notches when said bar is retracted.

6. A conveyor as described in claim 2 wherein the surface of said rest area is convex.

7. A conveyor as described in claim 2 wherein the surface of said rest area is convex and the ends thereof are merged into the remainder of the surface of the element by smoothly rounded transitional surfaces.

8. A conveyor as described in claim 2 wherein said propelling member is a belt having a depending central rib; said elements having a circumferential channel for receiving said rib; rotatable belt engaging guides mounted on said conveyor beneath said belt at spacings such that several of said elements are positioned between each of said guides; said guides being positioned with their belt engaging surfaces in a plane between that formed by the rest areas of said elements and the vertical plane at which said belt is capable of transmitting propelling force to the articles for guiding said belt and supporting said belt at least partially out of contact with said elements when said elements are held with their rest areas upwardly toward said belt.

9. A conveyor as described in claim 2 wherein said conveyor track is made up of a plurality of rollers which contact and are driven by said propelling member when it is in its raised position.

10. A conveyor as described in claim 2 wherein said propelling member is mounted generally co-planar with the conveying surface of said conveyor track and in its raised position makes frictional contact with the articles thereon; low friction support members mounted in said conveyor track on each side of said propelling member and cooperating with said propelling member for transporting said articles.

References Cited by the Examiner

UNITED STATES PATENTS

| | | | |
|---|---|---|---|
| 2,985,278 | 5/1961 | McKnight et al. | 198—160 |
| 3,034,637 | 5/1962 | Swezey et al. | 198—160 |
| 3,116,823 | 1/1964 | Schneider | 198—127 |

SAMUEL F. COLEMAN, *Primary Examiner.*

HUGO O. SCHULZ, *Examiner.*

R. E. KRISHER, *Assistant Examiner.*